United States Patent
Maruyama et al.

(10) Patent No.: US 8,250,594 B2
(45) Date of Patent: Aug. 21, 2012

(54) INFORMATION PROVIDING DEVICE, INFORMATION ACQUISITION TERMINAL, BROADCAST RECEIVING TERMINAL, INFORMATION PROVIDING SYSTEM, INFORMATION PROVIDING METHOD, AND PROGRAM

(75) Inventors: Tetsuo Maruyama, Tokyo (JP); Tetsu Sumita, Tokyo (JP); Kaori Wada, Tokyo (JP)

(73) Assignees: Sony Corporation, Tokyo (JP); Plat-Ease Corporation, Tokyo (JP)

( * ) Notice: Subject to any disclaimer, the term of this patent is extended or adjusted under 35 U.S.C. 154(b) by 444 days.

(21) Appl. No.: 12/272,107

(22) Filed: Nov. 17, 2008

(65) Prior Publication Data
US 2009/0133064 A1 May 21, 2009

(30) Foreign Application Priority Data
Nov. 19, 2007 (JP) ................. 2007-299796

(51) Int. Cl.
| | | |
|---|---|---|
| H04H 60/33 | (2008.01) | |
| H04N 7/173 | (2011.01) | |
| H04N 5/445 | (2011.01) | |
| G06F 3/00 | (2006.01) | |
| G06F 13/00 | (2006.01) | |

(52) U.S. Cl. ................. 725/9; 725/24; 725/40
(58) Field of Classification Search ................. 725/9, 24, 725/37, 40, 43, 51, 109, 133, 135, 138, 139, 725/141, 142
See application file for complete search history.

(56) References Cited

U.S. PATENT DOCUMENTS

| | | | | |
|---|---|---|---|---|
| 6,317,881 | B1* | 11/2001 | Shah-Nazaroff et al. | 725/24 |
| 6,585,521 | B1* | 7/2003 | Obrador | 434/236 |
| 7,739,140 | B2* | 6/2010 | Vinson et al. | 705/7.32 |
| 2003/0093784 | A1* | 5/2003 | Dimitrova et al. | 725/10 |
| 2005/0015803 | A1* | 1/2005 | Macrae et al. | 725/41 |
| 2009/0158308 | A1* | 6/2009 | Weitzenfeld et al. | 725/10 |

FOREIGN PATENT DOCUMENTS

| | | |
|---|---|---|
| EP | 1 784 009 | 5/2007 |
| JP | 2007 34664 | 2/2007 |
| WO | WO 2004 111901 | 12/2004 |
| WO | WO 2005 064941 | 7/2005 |
| WO | WO 2007 026357 | 3/2007 |

* cited by examiner

*Primary Examiner* — John Schnurr
(74) *Attorney, Agent, or Firm* — Frommer Lawrence & Haug LLP; William S. Frommer; Paul A. Levy

(57) ABSTRACT

An ECG server for providing ECG information about a program to broadcast receiving terminals and user terminals includes an ECG information storage unit for storing the ECG information including attribute information, an emotion information acquisition unit for acquiring emotion information representing emotions of viewers about content of the program displayed by the broadcast receiving terminals via at least one of the information acquisition terminals, an emotion information analysis unit for analyzing at least one piece of the acquired emotion information, and an ECG unit configuration unit for configuring an ECG unit by associating at least one piece of the ECG information with the program and associating at least one piece of the acquired emotion information with the program based on attribute information of the ECG information to suit analysis results of the emotion information. Accordingly, viewers can be lured to view the program by inviting viewers to view the program.

16 Claims, 7 Drawing Sheets

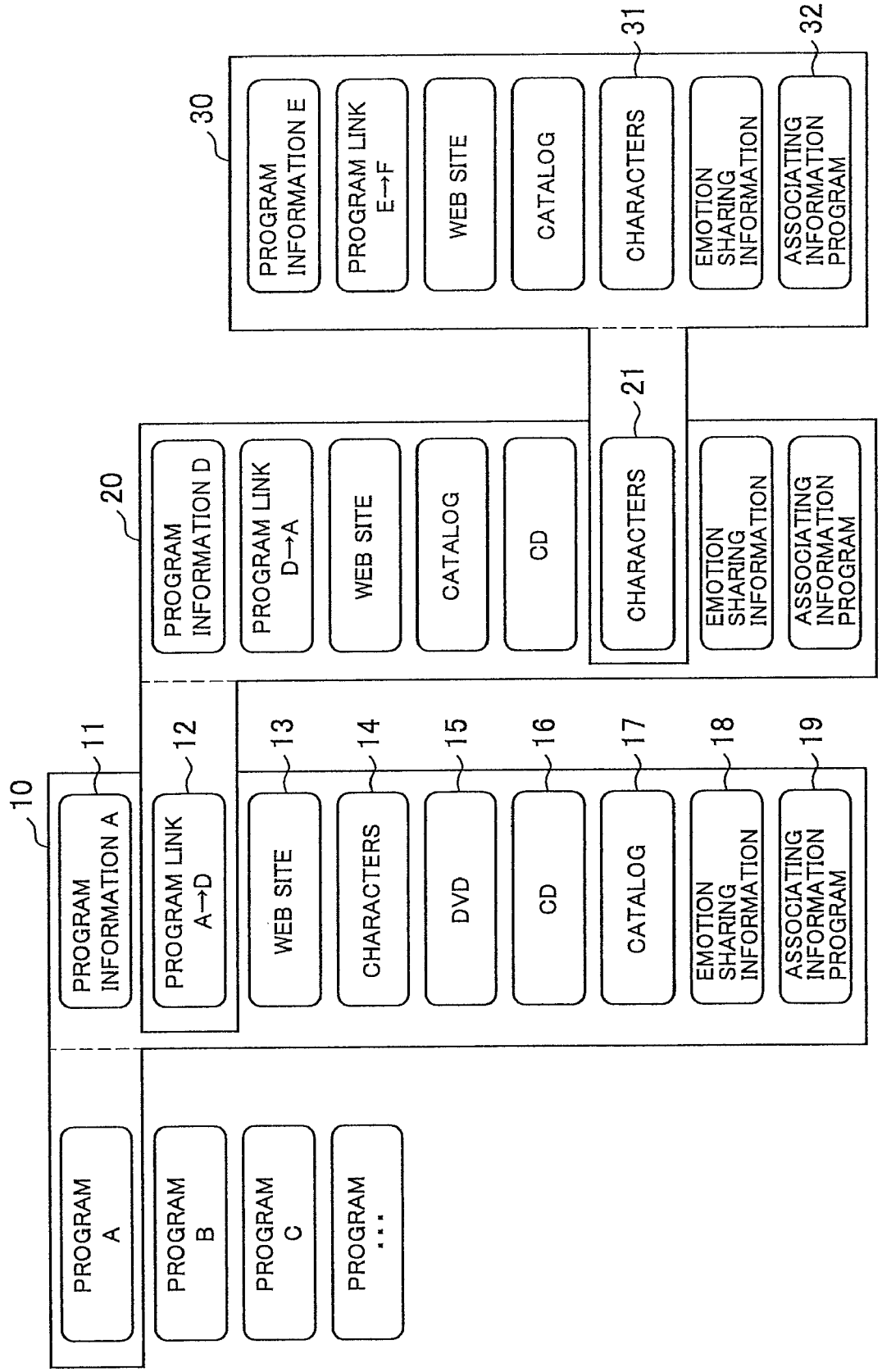

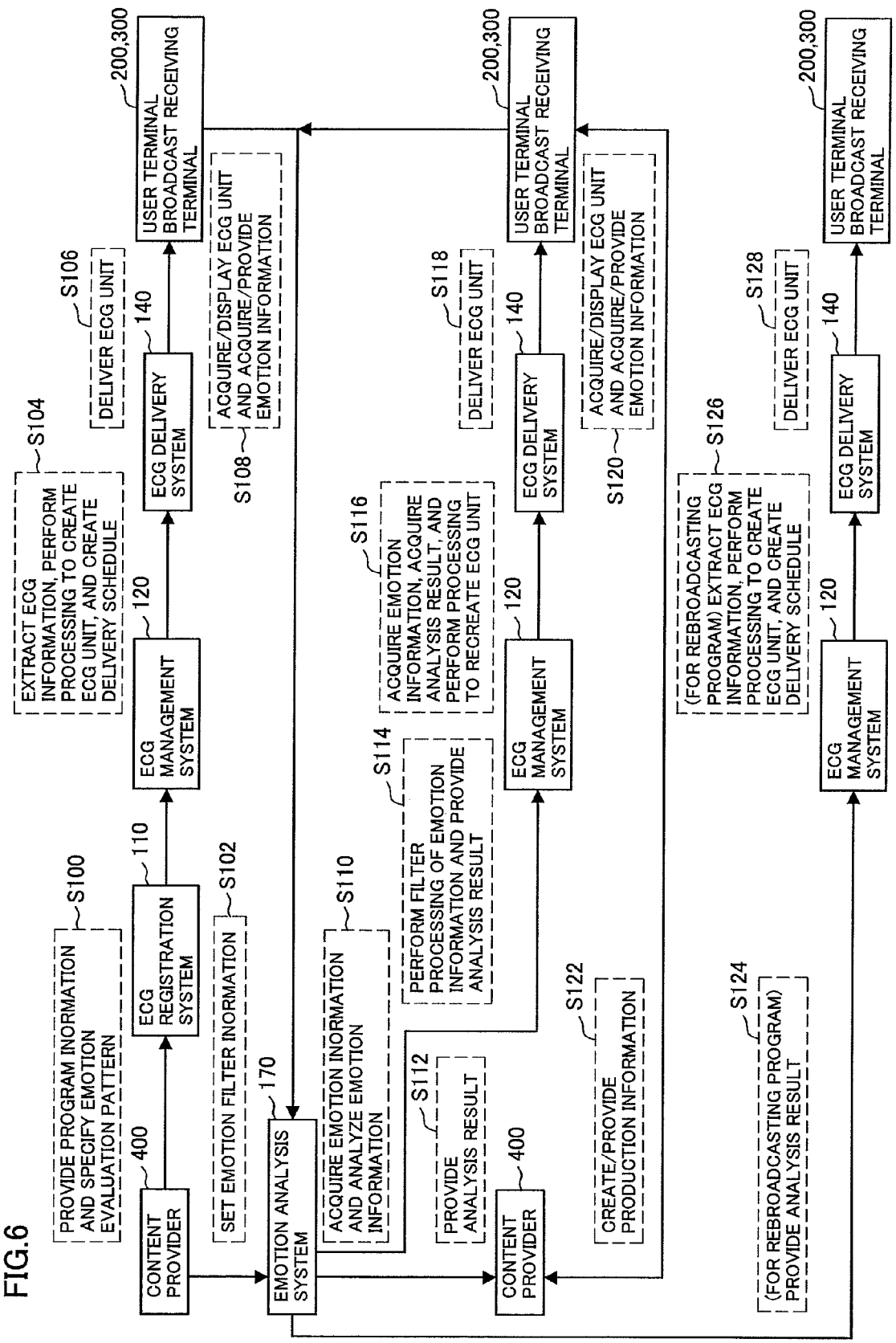

INFORMATION PROVIDING DEVICE, INFORMATION ACQUISITION TERMINAL, BROADCAST RECEIVING TERMINAL, INFORMATION PROVIDING SYSTEM, INFORMATION PROVIDING METHOD, AND PROGRAM

CROSS REFERENCES TO RELATED APPLICATIONS

The present invention contains subject matter related to Japanese Patent Application JP 2007-299796 filed in the Japan Patent Office on Nov. 19, 2007, the entire contents of which being incorporated herein by reference.

BACKGROUND OF THE INVENTION

1. Field of the Invention

The present invention relates to an information providing device, an information acquisition terminal, a broadcast receiving terminal, an information providing system, an information providing method, and a program.

2. Description of the Related Art

Broadcast services such as provision of a program for program propaganda and that of an audience participation program are known to be effective to efficiently transmit sponsor advertisements of a program by improving the audience rating of the program. A program for program propaganda can invite viewers to view the program by being provided in a timely fashion. An audience participation program can invite viewers to view the program through viewing participation of the program and also lure viewers to view the program.

SUMMARY OF THE INVENTION

However, it is desired to transmit sponsor advertisements of a program more efficiently by further improving the audience rating of the program. Here, the following shortcomings of the broadcast services in related art can be pointed out.

With regard to a program for program propaganda, an excellent effect to invite viewing can be anticipated, it is too much to anticipate an effect to lure viewers to view the program because only the provision of the program is announced in advance. Thus, viewers often view the program while doing some other work or the like and, though the audience rating of the program rises, sponsor advertisements of the program can hardly be transmitted efficiently. Further, a program for program propaganda is created for each program to be propagandized before being incorporated into a programming schedule and therefore, production costs are necessary and also manpower is necessary for programming work.

An audience participation program, on the other hand, exchanges information between a content provider and viewers by using communication devices such as phones and facsimiles, a data broadcasting technology or the like, and an effect to lure viewers to view the program can be anticipated, as well as an effect to invite viewing. However, when communication devices are used, processing of information exchange becomes complicated because operations by operators become necessary or the like. When a data broadcasting technology is used, on the other hand, the content provider can acquire information from a plurality of viewers, but it is difficult for the content provider to provide, based on the acquired information, suitable information to viewers. Therefore, it is difficult for the content provider to bi-directionally exchange information with viewers and also to sufficiently stir up interest in participation in the program. Further, because an audience participation program is provided by linking program metadata created for each program to video/audio information of the program, production costs are necessary and also manpower is necessary for linking work.

It is desirable to provide an information providing device, an information acquisition terminal, a broadcast receiving terminal, an information providing system, an information providing method, and a program capable of inviting viewers to view a program and luring viewers to view the program.

According to a first embodiment of the present invention, there is provided an information providing device connectible to a plurality of broadcast receiving terminals for acquiring and displaying video information of a program and electronic contents guide (ECG) information about the program and a plurality of information acquisition terminals for acquiring and displaying ECG information about the program via a communication network to provide ECG information about the program to the broadcast receiving terminals and the information acquisition terminals. The information providing device includes an ECG information storage unit for storing the ECG information including attribute information, an emotion information acquisition unit for acquiring emotion information representing emotions of viewers about content of the program displayed by the broadcast receiving terminals via at least one of the information acquisition terminals, an emotion information analysis unit for analyzing at least one piece of the acquired emotion information, an ECG unit configuration unit for configuring an ECG unit by associating at least one piece of the ECG information with the program and associating at least one piece of the acquired emotion information with the program based on the attribute information of the ECG information to suit analysis results of the emotion information, and an ECG unit providing unit for providing the ECG unit to the plurality of broadcast receiving terminals and the plurality of information acquisition terminals in linkage with a progression of the program.

According to the above configuration, the information providing device acquires emotion information of viewers via at least one information acquisition terminal and provides the acquired emotion information to the plurality of broadcast receiving terminals and/or the plurality of information acquisition terminals as part of an ECG unit. Here, the emotion information is information representing emotions such as human feelings, sympathy, and aversions evoked in viewers by content of a program and includes qualitative information representing the type of emotion and/or quantitative information representing the degree of emotion. Emotion information includes character information, selection information, or information by various sensors input by a viewer via an information acquisition terminal. Emotion information is thereby shared among viewers so that other viewers who have perused the emotion information can be invited to view the program. Moreover, if other viewers issue other emotion information, the other emotion information is shared again among viewers and thus, a cumulative viewing invitation effect through acquisition of emotion information can be anticipated. The information providing device also analyzes at least one piece of the acquired emotion information, configures an ECG unit about the program based on the attribute information of the ECG information to suit analysis results of the emotion information, and provides the ECG unit to the plurality of broadcast receiving terminals and the plurality of information acquisition terminals in linkage with a progression of the program. Accordingly, an ECG unit configured to suit analysis results of the emotion information is provided and thus, viewers who have perused ECG information contained in the ECG unit can be lured to view the program. Therefore, viewers can be lured to view the program by inviting viewers to view the program.

The emotion information may be classified into one of evaluation categories contained in an emotion evaluation pattern defined for each program and the ECG information into one of evaluation categories contained in the emotion evaluation pattern based on the attribute information of the ECG information, and the ECG unit configuration unit may configure the ECG unit by associating at least one piece of the ECG information with a program and an evaluation category of the ECG information based on the attribute information of the ECG information to suit analysis results of the emotion information. Accordingly, the emotion information is classified into one of evaluation categories contained in the emotion evaluation pattern defined for each of the programs and the ECG information into one of evaluation categories based on the attribute information. Here, the emotion information is used as an index to evaluate qualitative information representing each of emotions such as human feelings, sympathy, and aversions evoked in viewers by content of a program and/or quantitative information representing the degree of emotion. The evaluation index contained in the emotion evaluation pattern is classified by the evaluation category defined for each program. Then, an ECG unit is configured by associating at least one piece of ECG information with an evaluation category of the ECG information based on the attribute information of the ECG information to suit analysis results of the emotion information. Accordingly, a content provider can make viewers view ECG information suiting emotions of viewers based on evaluation categories of emotion information issued by viewers and those of ECG information.

The ECG unit configuration unit may configure the ECG unit so that when more emotion information classified into a specific evaluation category is acquired than emotion information classified into other evaluation categories based on analysis results of the emotion information, ECG information classified into evaluation categories that can promote or those that can allay emotions represented by the emotion information classified into the specific evaluation category is contained. Accordingly, when more emotion information classified into a specific evaluation category is acquired, an ECG unit is configured so that ECG information classified into evaluation categories that can promote or those that can allay emotions represented by the emotion information classified into the specific evaluation category is contained and therefore, a content provider can provide ECG information reflecting emotion information of viewers with respect to the program to viewers.

The ECG unit configuration unit may configure the ECG unit so that when an amount of emotion information classified into a specific evaluation category exceeding a predetermined threshold is acquired based on analysis results of the emotion information, ECG information classified into evaluation categories that can promote or those that can allay emotions represented by the emotion information classified into the specific evaluation category is contained. Accordingly, when emotion information classified into a specific evaluation category exceeding a predetermined threshold is acquired, an ECG unit is configured so that ECG information classified into evaluation categories that can promote or those that can allay emotions represented by the emotion information classified into the specific evaluation category is contained and therefore, a content provider can provide ECG information reflecting emotion information of viewers with respect to the program to viewers.

The emotion information analysis unit may select emotion information associated with the program based on emotion filter information defined by a content provider providing the program. Accordingly, the emotion information associated with the program is selected based on emotion filter information and therefore, the content provider can prevent provision of unsuitable emotion information such as emotion information containing immoral expressions.

The ECG unit configuration unit may select ECG information to be associated with the program based on ECG filter information defined by a content provider providing the program. Accordingly, the ECG information to be associated with the program is selected based on ECG filter information and therefore, the content provider can prevent provision of unsuitable ECG information such as ECG information related to sponsors competing against the sponsor providing the program.

The emotion information analysis unit may provide analysis results of the emotion information to a content provider providing the program. Accordingly, analysis results of emotion information are provided to the content provider and therefore, the content provider can provide program effect information such as information to invite viewers to view the program to broadcast receiving terminals and/or information acquisition terminals based on analysis results.

The emotion information acquisition unit may acquire an evaluation category selected via the information acquisition terminal among evaluation categories contained in an emotion evaluation pattern defined for each program as the emotion information. Accordingly, an evaluation category selected from among evaluation categories contained in the emotion evaluation pattern defined for each program is acquired as emotion information. This facilitates provision of emotion information by viewers so that the content provider can prompt viewers to provide emotion information via the information providing device.

The emotion information acquisition unit may acquire emotion information qualitatively and/or quantitatively representing emotions of viewers with respect to the program via the information acquisition terminal. Accordingly, emotion information qualitatively and/or quantitatively representing emotions of viewers with respect to the program is acquired and therefore, the content provider can analyze emotions of viewers with respect to the program qualitatively and/or quantitatively.

An ECG unit about the program may be configured by containing the ECG information and associating information associating the ECG information with the program so that the ECG information is associated cross-referably among the ECG units based on identification information of the ECG information and the associating information. Accordingly, ECG information is unified as an ECG unit for each program and ECG information becomes cross-referable among ECG units based on identification information of the ECG information and the associating information. This allows efficient arrangement of a large amount of ECG information about programs as ECG units so that viewers can intuitively search for ECG information contained in the ECG units.

According to a second embodiment of the present invention, there is provided an information acquisition terminal contained in an information providing system in which a plurality of broadcast receiving terminals for acquiring and displaying video information of a program and electronic contents guide (ECG) information about the program and a plurality of information acquisition terminals are connectible to an information providing device providing ECG information about the program via a communication network to acquire ECG information about the program from the information providing device before displaying the ECG information. The information acquisition terminal includes an emotion information providing unit for acquiring emotion information representing emotions of viewers with respect to content of the program displayed by the broadcast receiving terminal to provide the emotion information to the information providing device, an ECG unit acquisition unit for acquiring an ECG unit configured by associating at least one piece of the ECG information with the program and associating at least one piece of the emotion information with the program based on attribute information of the ECG information to suit analysis results obtained by analyzing at least one piece of the emotion information acquired by the information providing device from the information providing device, and a display control unit for controlling a display of the acquired ECG unit.

According to the above configuration, the information acquisition terminal acquires emotion information of viewers to provide the emotion information to the information providing device and acquires emotion information provided to the information providing device by other information acquisition terminals as part of an ECG unit from the information providing device. Accordingly, emotion information is shared among viewers and therefore, other viewers who have perused the emotion information can be invited to view the program. Moreover, if other viewers issue other emotion information, the other emotion information is shared again among viewers and thus, a cumulative viewing invitation effect through acquisition of emotion information can be anticipated. The information acquisition terminal also acquires an ECG unit configured to suit analysis results of emotion information from the information providing device. Accordingly, an ECG unit configured to suit analysis results of the emotion information is provided and thus, viewers who have perused ECG information contained in the ECG unit can be lured to view the program. Therefore, viewers can be lured to view the program by inviting viewers to view the program.

The emotion information may be classified into one of evaluation categories contained in an emotion evaluation pattern defined for each of the programs and the ECG information into one of evaluation categories contained in the emotion evaluation pattern based on attribute information of the ECG information, and the ECG unit acquisition unit may acquire an ECG unit configured by associating at least one piece of the ECG information with the program and an evaluation category of the ECG information based on the attribute information of the ECG information to suit analysis results of the emotion information and the display control unit may control the display of the ECG information based on the evaluation category of emotion information provided to the information providing device and that of the ECG information contained in the acquired ECG unit. Accordingly, the emotion information is classified into one of evaluation categories contained in the emotion evaluation pattern defined for each of the programs and the ECG information into one of evaluation categories based on the attribute information. Then, an ECG unit is configured by associating at least one piece of ECG information with an evaluation category of the ECG information based on the attribute information of the ECG information to suit analysis results of the emotion information. Accordingly, viewers can view ECG information suiting their emotions based on evaluation categories of emotion information issued by the viewers and those of ECG information.

The emotion information acquisition unit may acquire emotion information qualitatively and/or quantitatively representing emotions of viewers with respect to the program. Accordingly, emotion information qualitatively and/or quantitatively representing emotions of viewers with respect to the program is acquired and therefore, viewers can qualitatively and/or quantitatively express their emotions with respect to the program.

According to a third embodiment of the present invention, there is provided a broadcast receiving terminal contained in an information providing system in which a plurality of information acquisition terminals for acquiring electronic contents guide (ECG) information about a program from an information providing device to display the ECG information and a plurality of broadcast receiving terminals are connectible to the information providing device providing the ECG information about the program via a communication network to acquire and display video information of the program and ECG information about the program. The broadcast receiving terminal includes an ECG unit acquisition unit for acquiring an ECG unit configured by associating at least one piece of the ECG information with the program and associating at least one piece of emotion information representing emotions of viewers with respect to content of the program displayed by the broadcast receiving terminal with the program based on attribute information of the ECG information to suit analysis results obtained by analyzing at least one piece of the emotion information acquired by the information providing device from the information providing device and a display control unit for controlling video information of the acquired program and a display of the acquired ECG unit.

According to the above configuration, the broadcast receiving terminal acquires emotion information provided to the information providing device by at least one information acquisition terminal as part of an ECG unit from the information providing device. Accordingly, emotion information is shared among viewers and therefore, other viewers who have perused the emotion information can be invited to view the program. Moreover, if other viewers issue other emotion information, the other emotion information is shared again among viewers and thus, a cumulative viewing invitation effect through acquisition of emotion information can be anticipated. The broadcast receiving terminal also acquires an ECG unit configured to suit analysis results of emotion information from the information providing device. Accordingly, an ECG unit configured to suit analysis results of the emotion information is provided and thus, viewers who have perused ECG information contained in the ECG unit can be lured to view the program. Therefore, viewers can be lured to view the program by inviting viewers to view the program.

A program effect information processing unit for receiving program effect information provided based on analysis results of the emotion information from a content provider to display the program effect information along with video information of the program may further be provided. Accordingly, program effect information provided by the content provider is received and displayed along with video information of the program and therefore, viewers can peruse, for example, information to invite and lure viewers to view the program along with video information of the program.

According to a fourth embodiment of the present invention, there is provided an information providing system including the information providing device according to the first embodiment of the present invention, the information acquisition terminal according to the second embodiment, and the broadcast receiving terminal according to the third embodiment.

According to a fifth embodiment of the present invention, there is provided an information providing method applied to the information providing device according to the first embodiment of the present invention.

According to a sixth embodiment of the present invention, there is provided a program causing a computer to execute the information providing method according to the fifth embodiment of the present invention.

According to the embodiments of the present invention described above, an information providing device, an information acquisition terminal, a broadcast receiving terminal, an information providing system, an information providing method, and a program capable of inviting viewers to view a program and luring viewers to view the program can be provided.

BRIEF DESCRIPTION OF THE DRAWINGS

FIG. 3 is an explanatory diagram exemplifying the configuration of an ECG unit;

FIG. 6 is a flow chart showing the flow of an information providing method according to the present embodiment;

DETAILED DESCRIPTION OF THE PREFERRED EMBODIMENTS

Figure 1:
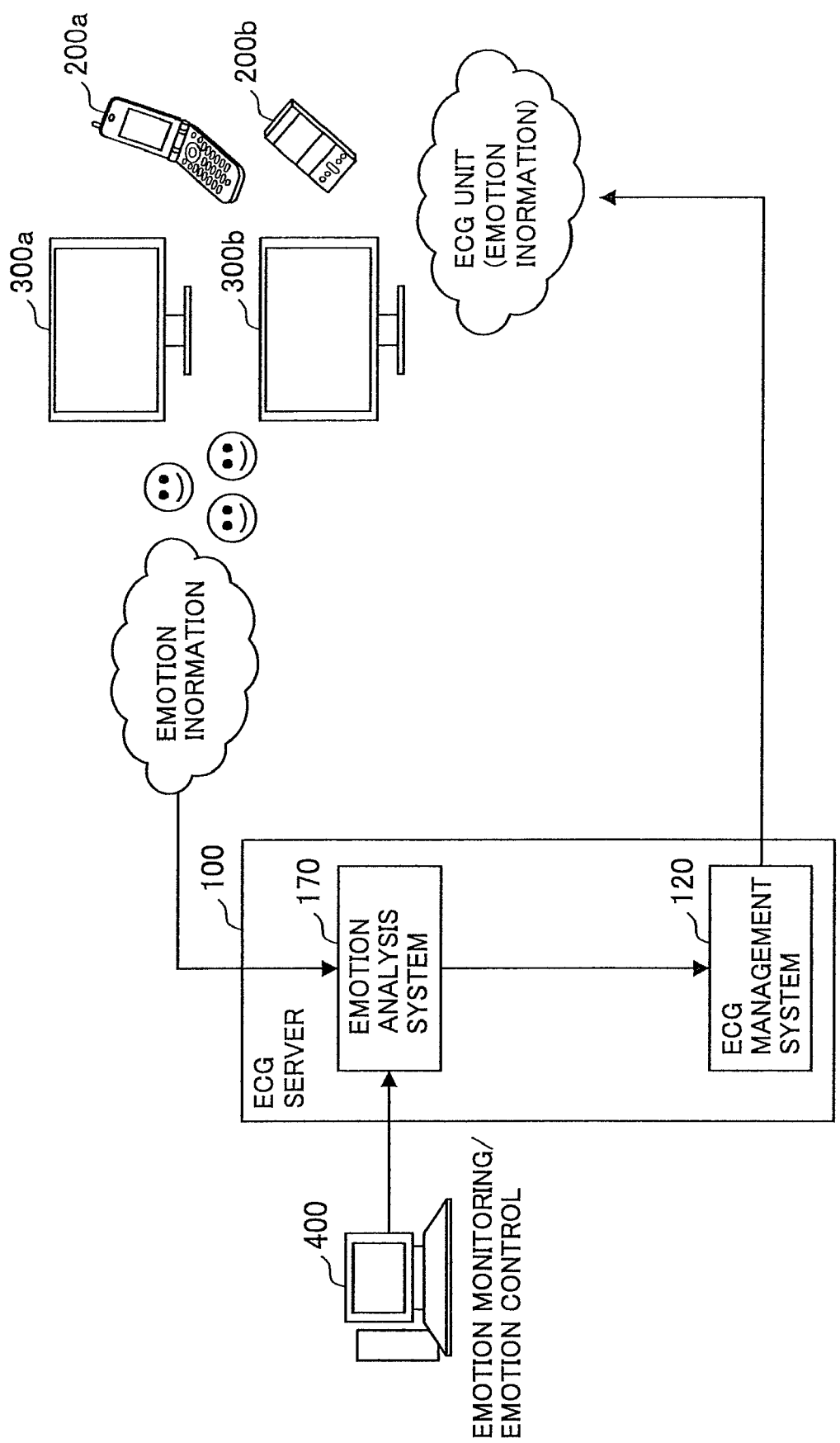
FIG. 1 is an explanatory diagram conceptually showing an overall configuration of an information providing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Overall Configuration of Information Providing System)

FIG. 1 is an explanatory diagram conceptually showing the overall configuration of an information providing system according to an embodiment of the present invention. As shown in FIG. 1, the information providing system includes an ECG (Electronic Content Guide) information server system (information providing device) 100 (hereinafter, also called the ECG server 100), a plurality of user terminals (information acquisition terminals) 200a, 200b, and a plurality of broadcast receiving terminals 300a, 300b.

The ECG server 100 has functions to register, manage, provide, and deliver ECG information about programs and provides ECG information about programs to the user terminals 200a, 200b and the broadcast receiving terminals 300a, 300b via a communication network. The user terminals 200a, 200b acquire ECG information about programs from the ECG server 100 via the communication network and displays the ECG information. The broadcast receiving terminals 300a, 300b acquires video/audio information of programs via an antenna or the like and displays the video/audio information and also acquires ECG information about programs from the ECG server 100 via the communication network and displays the ECG information.

The user terminals 200a, 200b can acquire emotion information representing emotions of users with respect to a program from users viewing the program displayed by the broadcast receiving terminals 300a, 300b. The user terminals 200a, 200b provide the acquired emotion information to the ECG server 100 and acquires emotion information provided by other user terminals from the ECG server 100 as part of an ECG unit described later. Emotion information is thereby shared among users. The ECG server 100 also analyzes at least one piece of the acquired emotion information, configures the ECG unit about a program containing at least one piece of ECG information so as to suit analysis results, and provides ECG information to the user terminals 200a, 200b and the broadcast receiving terminals 300a, 300b in linkage to the progression of a program. ECG information suiting analysis results of emotion information can thereby be provided.

Here, the emotion information is information representing emotions such as human feelings, sympathy, and aversions evoked in viewers by content of a program and includes qualitative information representing the type of emotion and/or quantitative information representing the degree of emotion.

Since emotion information is shared among users, users interested in a program by perusing emotion information of other users can be invited to view the program. Also, spontaneous provision of emotion information by users having emotions such as sympathy and aversions to emotion information by perusing emotion information of other users can be promoted. Accordingly, interest in participation of users in the program is increased to lure users to view the program. Thus, an effect to invite users to view a program and further to lure users to the program can cumulatively be generated by using provision of emotion information as a trigger. Moreover, ECG information suiting analysis results of emotion information is provided to users using provision of emotion information as a trigger and thus, an effect to invite users to view a program and further to lure users to the program through provision of ECG information can be enhanced.

Figure 2:
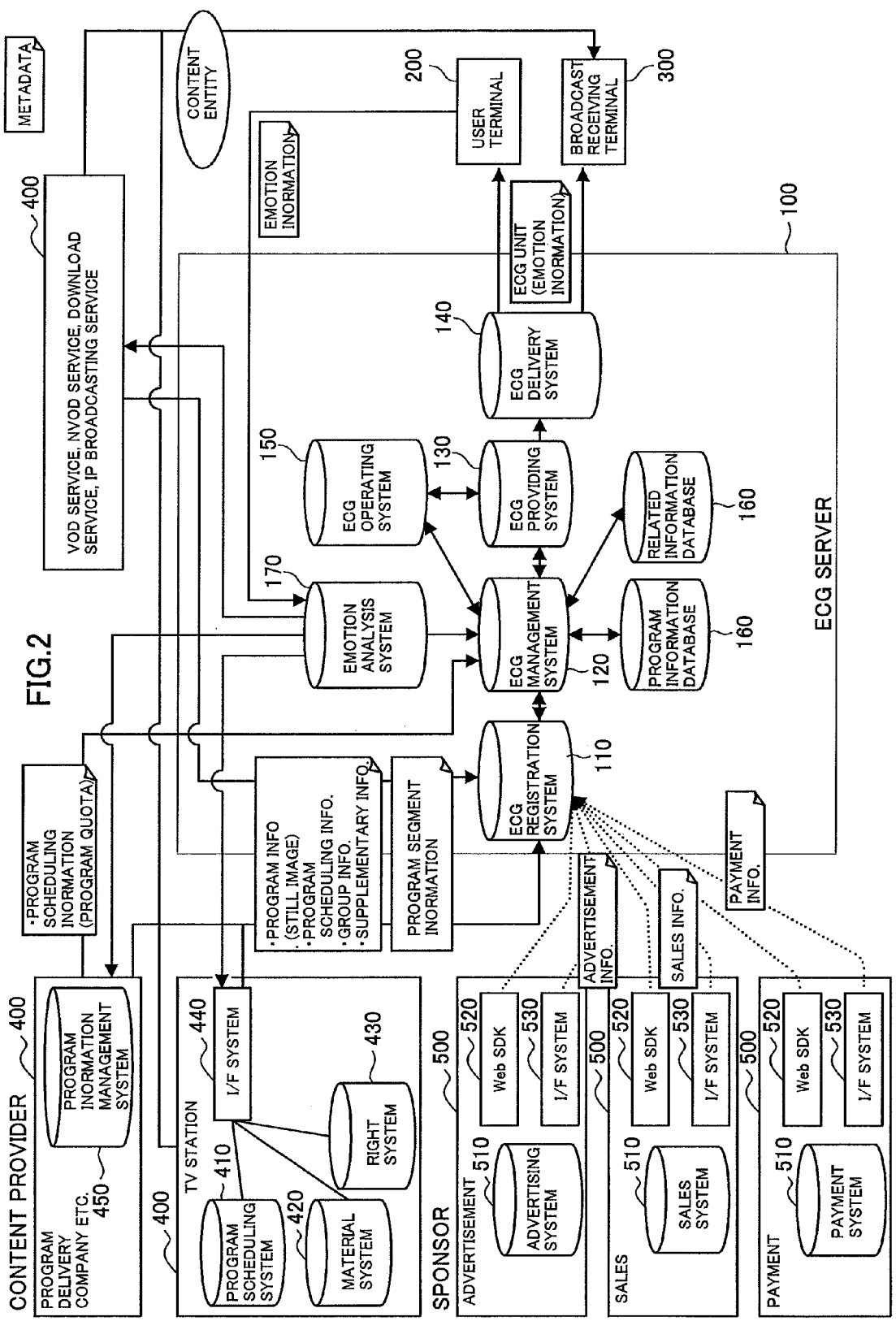
FIG. 2 is an explanatory diagram exemplifying a model of the overall configuration of the information providing system.

FIG. 2 is an explanatory diagram exemplifying a model of the overall configuration of the information providing system. As shown in FIG. 2, the information providing system includes the ECG server 100, the user terminal 200, the broadcast receiving terminal 300, a content provider 400, and a sponsor 500. Though only one user terminal 200 and one broadcast receiving terminal 300 are shown in FIG. 2, the information providing system includes at least two user terminals 200 and at least two broadcast receiving terminals 300.

The content provider 400 includes, for example, TV stations, data broadcasting stations, and program delivery companies. The content provider 400 operates various systems to manage program information such as a program scheduling system 410, a material system 420, a right system 430, and an interface (I/F) system 440. Program information includes, for example, EPG (Electronic Program Guide) information, program scheduling information, Cue sheet (progress schedule in a program) information, program format (pattern providing the title, CM, program content and the like) information, photo/logo information, program propaganda information, and right information. The content provider 400 provides video/audio information of a program, data broadcasting information, and EPG-SI (Electronic Program Guide-Service Information) information to the broadcast receiving terminal 300 and various kinds of program information to the ECG server 100.

The sponsor 500 includes, for example, advertising agencies, vendors, and payment agencies providing merchant services such as advertisement, sales, and payment services and in some cases, content providers providing video/audio information of programs. The sponsor 500 operates, for example, various kinds of information processing systems 510, a Web SDK (Software Development Kit) 520, and an I/F system 530. The sponsor 500 provides advertisement information, sales information and, in some cases, various kinds of information related to programs including program information to the user terminal 200 and the broadcast receiving terminal 300 via the ECG server 100.

(Configuration of ECG Server 100)

The configuration of the ECG server 100 operated by an information providing service operator or the like will be described with reference to FIG. 2. The ECG server 100 includes an ECG registration system 110, an ECG management system 120, an ECG providing system 130, an ECG delivery system 140, an ECG operating system 150, various databases 160, and an emotion analysis system 170.

The ECG registration system 110 registers program information such as programs, characters, programming schedules, program formats, Cue sheets, and provided lists provided by the content provider 400 and related information such as advertisement and sales provided by the sponsor 500 as ECG information. The ECG registration system 110 adds identification information to the program information and related information and selectively adds attribute information representing attributes held by each piece of information for registration as ECG information. The ECG registration system 110 functions as an ECG information storage unit or the like.

The ECG management system 120, whose details will be described later, manages a plurality of pieces of registered ECG information as an ECG unit by associating with a program. The ECG management system 120 creates a delivery schedule for delivering ECG units following program scheduling information and Cue sheet information of programs. The ECG management system 120 configures an ECG unit so as to suit analysis results of emotion information acquired from users in cooperation with the ECG delivery/providing systems 130, 140 and the emotion analysis system 170 before providing the ECG unit to the user terminal 200 and the broadcast receiving terminal 300. The ECG management system 120 functions as an ECG unit configuration unit or the like.

The ECG providing system 130 and the ECG delivery system 140 provide/deliver the ECG unit being managed to the user terminal 200 and the broadcast receiving terminal 300 according to an ECG delivery schedule. The ECG providing system 130 and the ECG delivery system 140 function as an ECG providing unit or the like.

The ECG operating system 150 operates the whole system of the ECG server 100 by controlling the ECG management system 120 and the ECG providing system 130.

The emotion analysis system 170, whose details will be described later, acquires emotion information of users, analyzes at least one piece of the acquired emotion information in linkage to the progression of a program, and provides analysis results to the content provider 400. Moreover, the emotion analysis system 170 outputs emotion information of users after performing suitable processing to the ECG management system 120. The emotion analysis system 170 functions as an emotion information acquisition unit, an emotion information analysis unit or the like.

(Configuration of User Terminal 200)

The user terminal 200 is, for example, an information processing terminal such as a portable phone, a PDA (Personal Digital Assistant), and a PC (Personal Computer) and in some cases, may be a remote controller for the broadcast receiving terminal 300. The user terminal 200 includes, for example, an emotion information acquisition unit, an operating unit, a communication unit, a display unit, a storage unit, and a control processing unit.

The emotion information acquisition unit is realized, for example, as a keyboard, a button, a switch, or various sensors. Various sensors may be provided integrally with the user terminal 200 or separately. The emotion information acquisition unit acquires emotion information representing emotions of users as, for example, character information, selection information, or sensor information.

Emotion information as character information is, for example, information acquired through operations of the keyboard such as "Well done!", "very angry", "Oh, woe is me!", and "What luck!" and represents emotions of users qualitatively. Emotion information as selection information is, for example, information acquired through an operation of buttons or switches to which selectable information is assigned in advance and represents emotions of users qualitatively and/or quantitatively. Emotion information as selection information becomes information quantitatively representing emotions of users, for example, in accordance with a frequency with which a button or switch is operated in a predetermined period.

Emotion information as sensor information is, for example, information acquired through a vibration sensor, pressure sensor, impact sensor, or voice sensor. Emotion information as sensor information is acquired by qualitatively and/or quantitatively evaluating emotions of users, for example, from an action of shaking the user terminal 200, an action of gripping the user terminal 200, an impact added to the user terminal 200, or voice uttered by users.

The operating unit includes, for example, an operating device for operating the functions of the user terminal 200 such as a selection button, decision button, and back button. The communication unit includes a communication device for performing communication with the ECG server 100 via a communication network. The display unit includes, for example, a display device such as a liquid crystal panel and a monitor for displaying ECG information acquired from the ECG server 100. The storage unit stores various kinds of information such as a program to control processing of functions of the user terminal 200 and processing data. The control processing unit performs, for example, processing of various kinds of information necessary for performing functions of the user terminal 200 and also controls the general functions of the user terminal 200.

(Configuration of Broadcast Receiving Terminal 300)

The broadcast receiving terminal 300 is, for example, a TV set, portable information terminal, mobile terminal, CATV (Common Antenna TeleVision) terminal, IPTV (Internet Protocol TeleVision) terminal, portable phone, PDA, or PC.

The broadcast receiving terminal 300 performs communication with an external system or external device via a communication network including, for example, an optical fiber, ADSL (Asymmetrical Digital Subscriber Line), telephone modem, power line, and wireless. The broadcast receiving terminal 300 receives programs provided via various kinds of transmission paths such as terrestrial analog broadcasting, terrestrial digital broadcasting, BS (Broadcast Satellite) analog broadcasting, BS digital broadcasting, 124, 128-degree CS (Communication Satellite) broadcasting, 110-degree CS broadcasting, CATV digital broadcasting, CATV analog broadcasting, and optical fiber broadcasting through an antenna, STB (Set Top Box) or the like.

The broadcast receiving terminal 300 includes a broadcast processing unit, an ECG information processing unit, a display unit, and a device control unit. Here, the broadcast processing unit has a function to receive video/audio information and data broadcasting information and, when necessary, to record/reproduce such information and that to control reception of EPG-SI information. The ECG information processing unit has a function to acquire ECG information, that to allow perusal of ECG information, and that to control processing of ECG information.

(Configuration of ECG Unit)

FIG. 3 is an explanatory diagram exemplifying the configuration of an ECG unit. As shown in FIG. 3, the ECG unit is configured for each program and includes ECG information representing program information, that representing related information, and that representing emotion sharing information used for emotion sharing processing described later. The ECG unit also includes associating information associating the program and the program information, related information, and emotion sharing information. The ECG unit includes a combination of program information and associating information as a minimum unit and selectively includes related information and emotion sharing information.

ECG information representing program information may be abbreviated as program information below, ECG information representing related information as related information, and ECG information representing emotion sharing information as emotion sharing information. Program information, related information, and emotion sharing information shown in FIG. 3 generically name a plurality of pieces of ECG information classified in each category. Each piece of ECG information contains identification information that can identify each piece of ECG information such as an ID number and selectively contains attribute information representing attributes of information contained in each ECG such as category information.

Emotion sharing information includes emotion information shared among users and emotion evaluation patterns defined for each program. Emotion evaluation patterns are used as an index to evaluate qualitative emotion information representing emotions such as human feelings, sympathy, and aversions and/or quantitative emotion information representing the degree of emotion. The index represented by emotion evaluation patterns can be classified, for example, into evaluation categories such as four types of emotions representing each emotion of joy/anger/pity/pleasure and two types of emotions representing sympathy/aversions and/or evaluation categories in accordance with the degree of each emotion.

If an ECG unit contains emotion sharing information, associating information includes information to associate each piece of ECG information contained in the ECG unit and an evaluation category contained in an emotion evaluation pattern. Association with the evaluation category is based on attribute information of each piece of ECG information using, for example, a technique of trend analysis. Accordingly, specific ECG information can be classified into one of evaluations categories contained in an emotion evaluation pattern, for example, as information evoking emotions such as human feelings, sympathy, or aversions in users and information in accordance with the degree of having each emotion.

FIG. 3 shows ECG units 10, 20, 30 about programs A, D, E respectively. For example, the ECG unit 10 about the program A includes related information such as program information 11 of the program A, link information 12 to the ECG unit about the program D, Web sites 13 about the program A, characters 14, DVDs 15, CDs 16, and catalogs 17, emotion sharing information 18, and associating information 19. An ECG unit has an executable metadata format and when the ECG unit is executed by the user terminal 200 or the broadcast receiving terminal 300, each piece of ECG information making up the ECG unit is sequentially displayed selectively through a user's operation or automatic processing.

ECG information making up the ECG unit is cross-referably associated among ECG units based on identification information of the ECG information and associating information for each ECG unit.

In the example shown in FIG. 3, for example, the ECG unit 10 about the program A is first perused. The ECG unit 10 about the program A contains the link information 12 to the program D related to the program A and the link information contains identification information showing the ECG unit 20 about the program D. If the link information is selected while perusing the ECG unit 10 about the program A, perusal of the ECG unit 10 about the program A is suspended and perusal of the ECG unit 20 about the program D is started after acquisition and execution of the ECG unit 20 about the program D. If, in this state, the back button is operated, perusal of the ECG unit 10 about the program A is restarted.

Next, assume that related information of characters 21 contained in the ECG unit 20 about the program B is selected. If, in this case, identification information of the selected related information is contained in associating information 32 of the ECG unit 30 about the program E, related information 31 of the ECG unit 30 about the program E can be linked. Accordingly, a user can intuitively peruse other related ECG units having common ECG information.

Next, assume that the emotion sharing information 18 contained in the ECG unit 10 about the program A is selected. Though details will be described later, processing in emotion sharing mode is started in this case based on emotion sharing information and a user can peruse emotion information shared among users.

ECG information representing program information and related information uses, as described above, program information provided by the content provider 400 and related information provided by the sponsor 500.

The content provider 400 accumulates a huge amount of program information that can be provided as ECG information such as EPG information, program scheduling information, program format information, Cue sheet information, basic program information, program production information, program logos/photos, program propaganda information, program sales information, and right information.

However, program information is actually created and managed using various data formats/structures in accordance with the type of program information. Thus, it is difficult to create and manage program information using a standardized data format/structure in order to use program information as ECG information and a huge amount of time and effort will be necessary to manage existing program information by systematic indexation in a tree structure. Advertisement information and sales information accumulated by the sponsor 500 also has the same issue as the program information.

Thus, for the purpose of using program information and related information as ECG information, management by using a data structure shown in FIG. 3 is proposed. In order to use the data structure, program information created and managed using various data formats/structures is first collected to divide into unit information by removing indexation and tree structures. Next, identification information is added to each piece of unit information and also attribute information is selectively added for processing into ECG information, which is incorporated into an ECG unit by associating with a specific program using associating information. Here, when adding attribute information, for example, a keyword contained in unit information is automatically extracted so that some pieces of category information can automatically be added as attribute information based on the keyword.

Further, related information is incorporated into the ECG unit if necessary. For this purpose, search conditions for searching for related information such as advertisement information and sales information about a program is first extracted from program information. Next, applicable related information is searched for from an existing advertisement database, sales database or the like according to the search conditions and the searched related information is processed into ECG information by adding identification information and attribute information, which is incorporated into the ECG unit by associating with the program using associating information.

Accordingly, an information providing service operator can efficiently put existing program information and related information in order as ECG units about programs without systematizing the existing program information and related information. Moreover, with the above data structure of the ECG unit, a user can intuitively do a search, instead of searching for desired information theoretically. Thus, program information and related information accumulated by the content provider 400 and sponsor 500 can be provided to users as convenient information.

(Processing of Emotion Sharing)

Figure 4A:
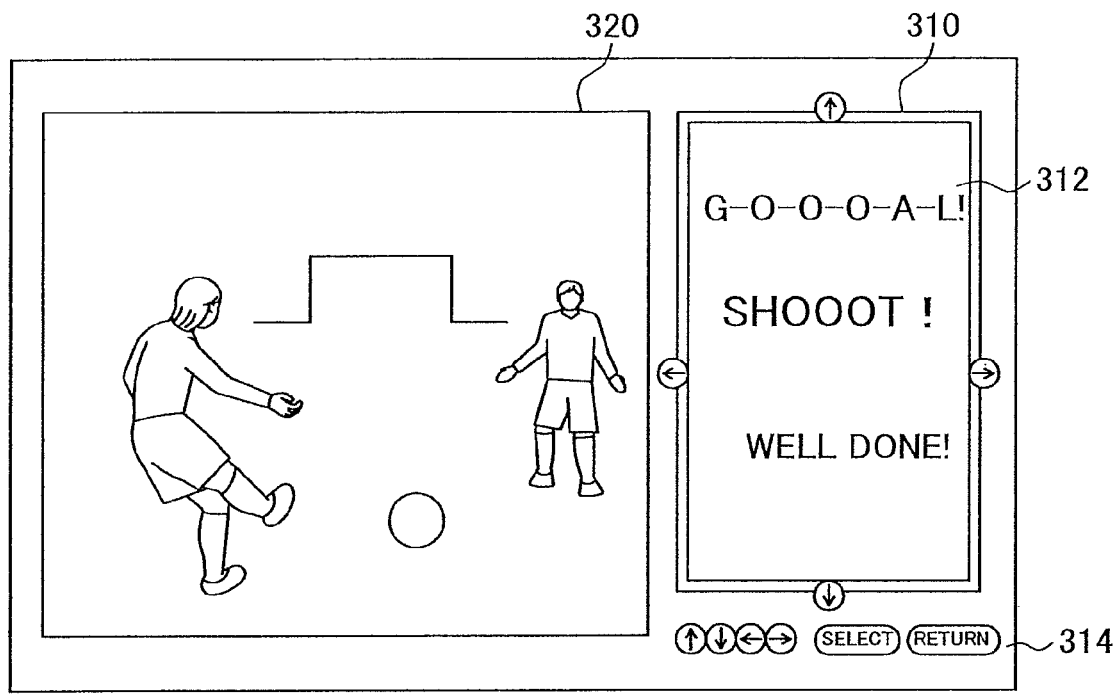
FIG. 4A is an explanatory diagram exemplifying a display screen in emotion sharing mode at a broadcast receiving terminal.
Figure 4B:
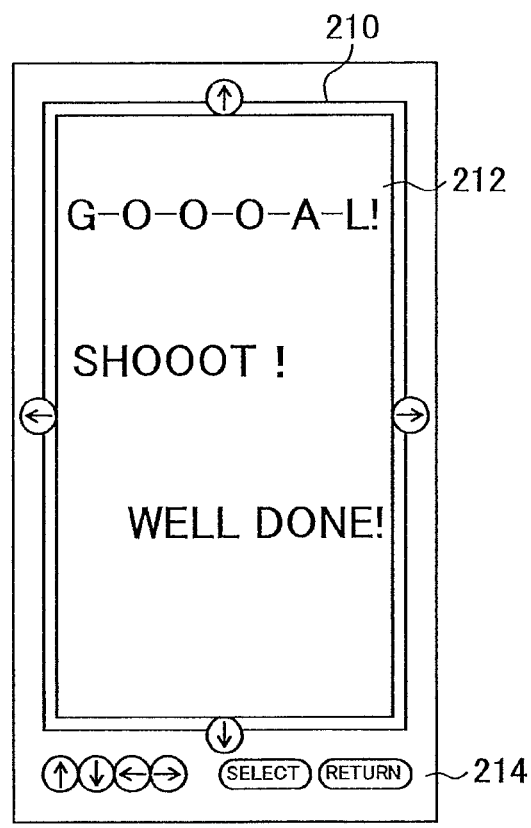
FIG. 4B is an explanatory diagram exemplifying the display screen in emotion sharing mode at a user terminal.
Figure 5A:
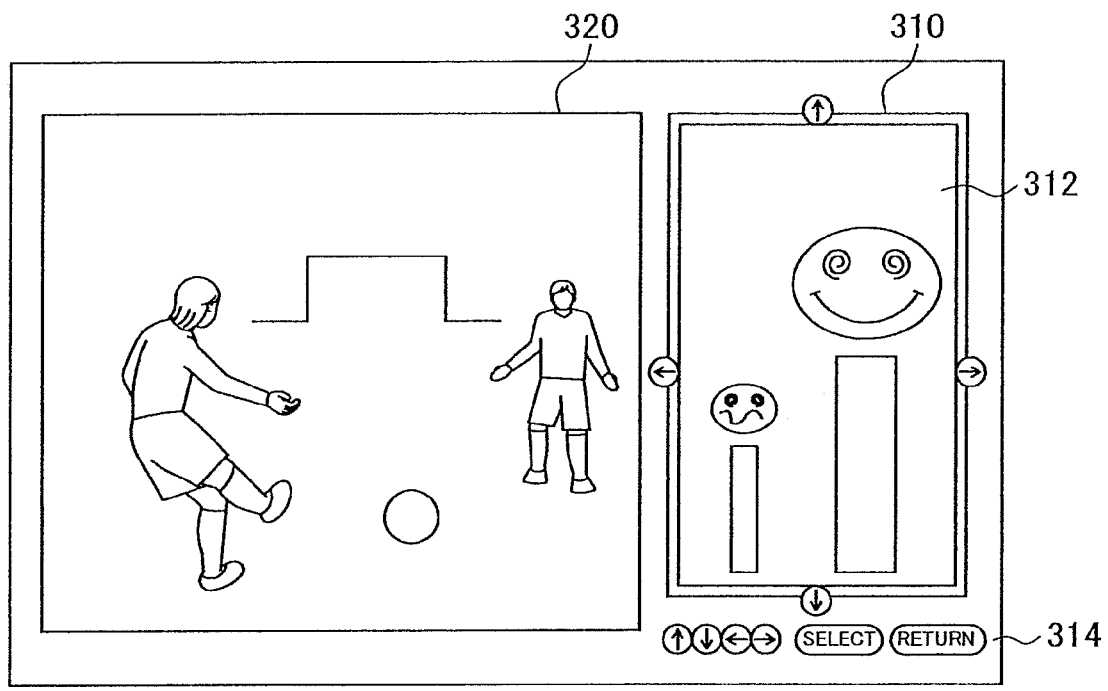
FIG. 5A is an explanatory diagram exemplifying the display screen in emotion sharing mode at the broadcast receiving terminal.
Figure 5B:
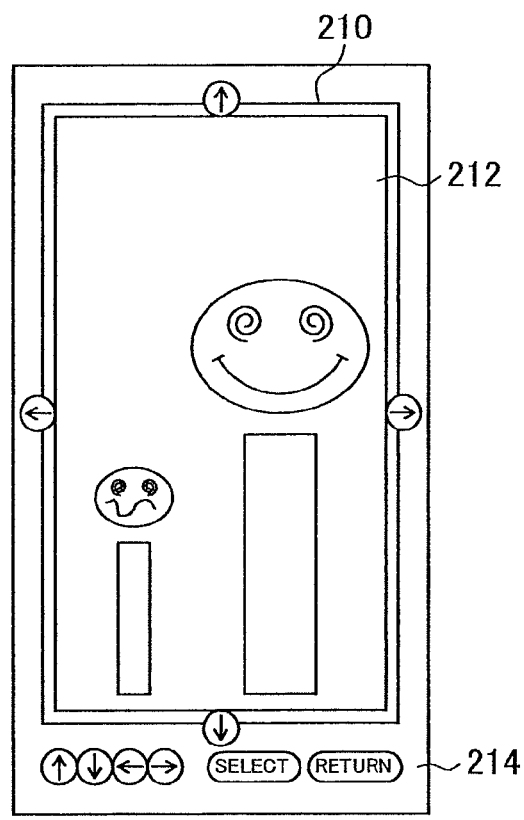
FIG. 5B is an explanatory diagram exemplifying the display screen in emotion sharing mode at the user terminal.

FIGS. 4A and 4B and FIGS. 5A and 5B are explanatory diagrams exemplifying display screens in emotion sharing mode at the user terminal 200 and the broadcast receiving terminal 300 according to the present embodiment. FIGS. 4A and 4B show the display screen in two-screen mode and FIGS. 5A and 5B show the display screen in voting mode.

A user can peruse ECG units provided from the ECG server 100 to the user terminal 200 or the broadcast receiving terminal 300 in units of pieces of ECG information by activating an ECG service. An ECG unit is constructed, as described above, by including program information, related information, emotion sharing information and the like. The user can select perusal in emotion sharing mode by selecting emotion sharing information contained in an ECG unit and also switch the display mode such as the two-screen mode and voting mode.

FIG. 4A shows the display screen of the broadcast receiving terminal 300 in two-screen mode and FIG. 4B shows the display screen of the user terminal 200. As shown in FIG. 4A, the display screen of the broadcast receiving terminal 300 is divided into an ECG information display frame 310 on the right side and a video information display frame 320 on the left side. The arrangement of the ECG information display frame 310 and the video information display frame 320 may be changed to a laterally symmetrical arrangement, vertical arrangement, or overlapped arrangement so that the arrangement is not limited to one shown in FIG. 4A. In the display screen exemplified in FIG. 4A, emotion information acquired from at least one user terminal and shared among users is displayed in the ECG information display frame 310 and, for example, an image reduced from video information of a soccer relaying program displayed in the video information display frame 320.

The ECG information display frame 310 includes an ECG information display area 312 for displaying ECG information and an operation information display area 314 for displaying operation information. In the display screen shown in FIG. 4A, "↑", "↓", "←", "→", "Select", and "Return" are displayed in the operation information display area 314 as selectable operation information.

If, for example, the "↑" button or the "↓" button is operated in the display screen, the display in the ECG information display area 312 is scrolled vertically. If the "←" button or the "→" button is operated, the display in the ECG information display area 312 is switched from the emotion sharing mode to the normal mode to display program information or related information contained in the ECG unit. If the "Select" button is operated in emotion sharing mode, for example, the display screen is switched to one for inputting emotion information of the user so that emotion information can be input. Emotion information may be input in real time in linkage to the progression of a program without the operation of the "Select" button. If the "Return" button is operated, the display screen is switched to the previous one. If, for example, no user operation is performed for a certain period of time, transition from the emotion sharing mode to the normal mode may automatically occur.

On the other hand, as shown in FIG. 4B, the display screen of the user terminal 200 has an ECG information display frame 210 and like the ECG information display frame 310 of the broadcast receiving terminal 300, emotion information shared among users is displayed in the ECG information display frame 210. Information displayed in the ECG information display frame 210 and the operation procedure for the display screen of the user terminal 200 are the same as those of the broadcast receiving terminal 300 and thus, a description thereof is omitted.

FIG. 5A shows the display screen of the broadcast receiving terminal 300 in voting mode and FIG. 5B shows the display screen of the user terminal 200. An image reduced from video information of a program is displayed in the video information display frame 320 and information created based on emotion information shared among users is displayed in the ECG information display frame 310.

In the example shown in FIGS. 5A and 5B, for example, one of an emotion representing joy or that representing pity is voted by users as alternative emotion information (voting data) after a goal is shot in a soccer game and a column chart showing totaled results of voting as a caricature is displayed in an ECG information display area 212 and the ECG information display area 312.

(Processing Sequence)

FIG. 6 is a flow chart showing the flow of an information providing method according to the present embodiment.

The content provider 400 provides program information to the ECG registration system 110 (step S100). Accordingly, the ECG registration system 110 adds identification information to the acquired program information, selectively adds attribute information for processing into ECG information, and registers the ECG information with a program information database or the like. The content provider 400 specifies the emotion evaluation pattern to be applied for each program to the ECG registration system 110 (step S100). Emotion evaluation patterns are maintained in the ECG management system 120 in advance as a plurality of pieces of selectable template information. The content provider 400 sets emotion filter information for performing filter processing of emotion information of users to the emotion analysis system 170 (S102). Here, the emotion filter information is information in databases of unsuitable expressions such as immoral expressions and expressions criticizing specific persons, corporations, and groups by name.

The ECG management system 120 extracts program information about a program from the program information database and the like and also extracts related information such as advertisement information and sales information regarding the program according to search conditions extracted from the program information from the program information database and the like in order to incorporate such information into the ECG unit of the program (step S104). Here, filter processing of extracted related information is performed as part of the so-called competitive checks so that, for example, related information of the sponsor 500 competing against the sponsor 500 of the program should not be incorporated. Accordingly, the content provider 400 can prevent provision of unsuitable ECG information such as ECG information related to sponsors competing against the sponsor providing the program.

The ECG management system 120 associates ECG information such as the extracted program information and related information with the program and also with the evaluation category contained in the emotion evaluation pattern. With association with the evaluation category, the extracted ECG information is unified as an ECG unit while being classified, for example, as information evoking emotions such as human feelings, sympathy, and aversions in users, information in accordance with the degree of having each emotion and the like (S104).

Here, the ECG management system 120 can contain a message to prompt users to provide emotion information in accordance with the progression of a program as part of emotion sharing information. The message may be one to make users in whom emotions are evoked by words or deeds uttered by characters in a program vote or an opinion of a commentator about content of the program. In this case, a message to make users select the evaluation category contained in the emotion evaluation pattern defined for each program may be contained. Provision of emotion information by users is thereby made easier so that the content provider 400 can prompt users to provide emotion information via the ECG server 100.

The ECG management system 120 creates a delivery schedule of ECG units according to a programming schedule, program format, and Cue sheet (S104). Here, programs are individually set in units of programs with provision start and finish dates/times and are scheduled in the programming schedule. On the other hand, programs are made up of many program materials such as materials of main program content, those of sponsor commercials, and those of program propaganda. Then, program materials are scheduled in the program format and Cue sheet in units of programs with provision start and finish dates/times and are provided from the content provider 400 in accordance with the progression of a program. Thus, the ECG management system 120 delivers, for example, the ECG unit about the program being provided when materials of main program content are provided according to a provision schedule of program materials and delivers the ECG unit about the program to be propagandized when materials of program propaganda are provided. Thus, the ECG management system 120 creates an ECG delivery schedule for each program.

The ECG delivery system 140 (the ECG providing/delivery system 130, 140) acquires ECG units from the ECG management system 120 according to an ECG delivery schedule to provide/deliver the ECG units to the user terminals 200 and the broadcast receiving terminal 300 (S106).

The user terminals 200 and the broadcast receiving terminal 300 acquire an ECG unit from the ECG delivery system 140 to display the ECG unit. Then, when emotion information is input by a user in emotion sharing mode, the user terminal 200 acquires the emotion information to provide the emotion information to the emotion analysis system 170 and also stores the acquired emotion information and the emotion evaluation pattern contained in the ECG unit (S108). Here, the user terminal 200 acquires emotion information as character information, selection information, or sensor information representing qualitative and/or quantitative information representing an emotion of the user.

The emotion analysis system 170 acquires emotion information from at least one of the user terminals 200, performs totaling processing at predetermined intervals, and performs analysis in linkage with the progression of a program (S110). The emotion analysis system 170 also records the acquired emotion information in an acquisition log. If the emotion information is character information, the emotion analysis system 170 performs syntax analysis of the character information to analyze to which evaluation category contained in the emotion evaluation pattern applied to the program the character information belongs. Then, the emotion analysis system 170 provides, for example, the total amount of acquired emotion information, amounts for each evaluation category and the like to the content provider 400 as analysis results of emotion information (S112). Accordingly, the content provider 400 can grasp, for example, emotions felt by users with respect to program materials in real time in linkage with the progression of a program.

The emotion analysis system 170 excludes emotion information containing unsuitable expressions from the acquired emotion information based on emotion filter information set by the content provider 400 to output emotion information containing only suitable expressions to the ECG management system 120 (S114). Accordingly, the content provider 400 can prevent provision of unsuitable emotion information such as emotion information containing immoral expressions. The emotion analysis system 170 outputs analysis results of emotion information and also emotion information, if necessary, to the ECG management system 120 (S114).

The ECG management system 120 acquires emotion information and analysis results of emotion information from the emotion analysis system 170 (S116). Based on the acquired emotion information and analysis results, the ECG management system 120 reconfigures the ECG unit. The ECG management system 120 updates emotion information shared among users, for example, as shown in FIG. 4B and information created based on emotion information, for example, as shown in FIG. 5B.

If, for example, the total amount of acquired emotion information exceeds a predetermined threshold, the ECG management system 120 judges that a huge reaction has been received from users to content of a program and can further add supplementary ECG information to the previous ECG unit. If, for example, a relatively large amount of emotion information representing joy is received, the ECG management system 120 can add ECG information that can further promote emotions of joy such as ECG information associated with the evaluation category of emotions evoking emotions of joy. If, on the other hand, a relatively large amount of emotion information representing anger is received, the ECG management system 120 can add ECG information that can allay emotions of anger such as ECG information associated with the evaluation category of emotions evoking emotions of pleasure.

In addition to adding new ECG information to existing ECG units, for example, the ECG management system 120 can change the order of ECG information displayed when an ECG unit is executed. Further, the ECG management system 120 can re-extract advertisement information and sales information suiting analysis results of emotion information from the related information database to reconfigure the ECG unit adapting to analysis results. If emotion sharing processing is suspended, the ECG management system 120 may configure the ECG unit so that the ECG unit does not contain emotion sharing information.

Accordingly, the content provider 400 can provide ECG information reflecting emotion information of users with respect to programs to users. When an ECG unit is reconfigured, just like when an ECG unit is configured, ECG information is reunified and ECG information is re-extracted, if necessary (S116).

The ECG delivery system 140 acquires ECG units from the ECG management system 120 according to an ECG delivery schedule to provide/deliver the ECG units to the user terminal 200 and the broadcast receiving terminal 300 (S118).

The user terminal 200 and the broadcast receiving terminal 300 acquire a reconfigured ECG unit from the ECG delivery system 140 to display the reconfigured ECG (S120). Here, the user terminal 200 determines to which evaluation category contained in the emotion evaluation pattern the emotion information stored when being provided to the emotion analysis system 170 belongs and extracts ECG information suiting the applicable evaluation category from the ECG unit based on associating information to display the ECG information.

If, for example, emotion information representing joy is stored, the user terminal 200 extracts ECG information that can promote emotions of joy from among ECG information contained in the reconfigured ECG unit based on associating information and displays the ECG information. If emotion information representing anger is stored, the user terminal 200 extracts ECG information that can allay emotions of anger and displays the ECG information.

Accordingly, the user can peruse ECG information that suits his (her) emotions. If no emotion information is provided by users, the user terminal 200 may extract ECG information belonging to a medium evaluation category of the emotion evaluation pattern to display the ECG information.

Here, if the emotion sharing mode is selected, acquisition of emotion information of users continues and the acquired emotion information is provided to the emotion analysis system 170 (S120).

Accordingly, emotion information is shared among users and other users who perused emotion information can be invited to view a program. If other users issue other emotion information, the other emotion information is shared again among users and thus, a cumulative viewing invitation effect through acquisition of emotion information can be anticipated. Further, ECG units configured to suit analysis results of emotion information are provided and thus, users who perused ECG information contained in the ECG units can be lured to view programs. Therefore, viewers can be invited to view programs and lured to view programs without being accompanied by shortcomings of broadcasting services in related art such as programs for program propaganda and audience participation programs.

Figure 7A:
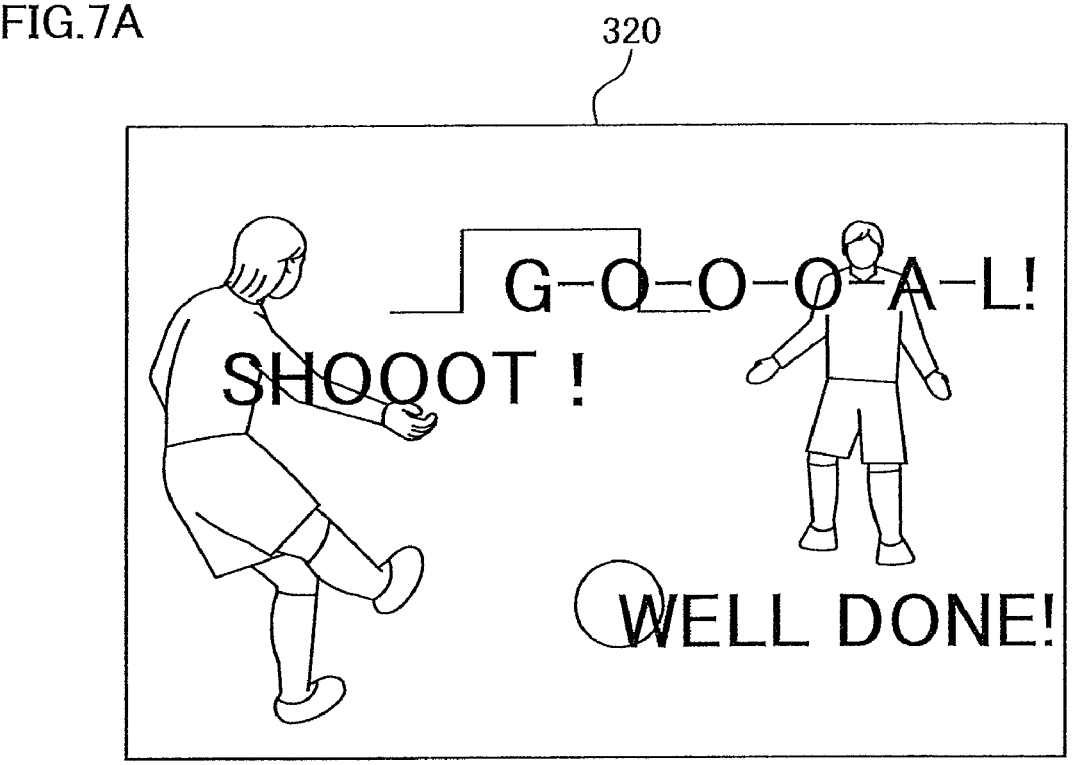
FIG. 7A is an explanatory diagram exemplifying a case of adding effects to video information of a program based on analysis results of emotion information.
Figure 7B:
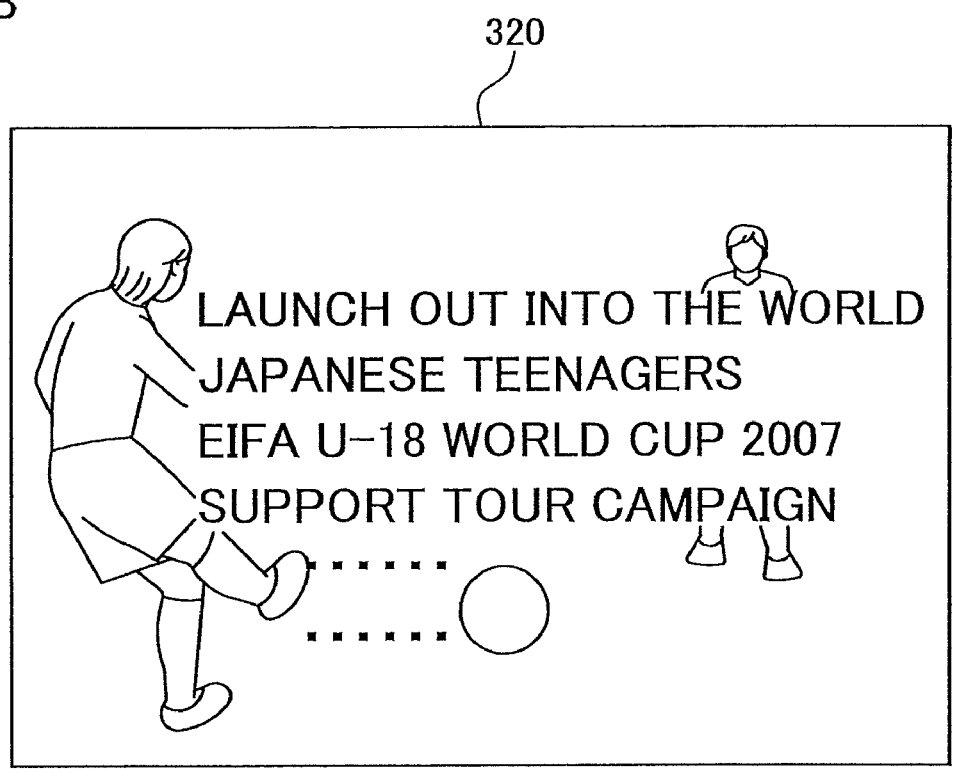
FIG. 7B is an explanatory diagram exemplifying the case of adding effects to video information of the program based on analysis results of emotion information.

The content provider 400, on the other hand, monitors analysis results of emotion information provided from the emotion analysis system 170 and adds effects to video information of a program if necessary, as shown, for example, in FIGS. 7A and 7B (S122). In this case, the content provider 400 provides, for example, information to invite and lure users to view a program, emotion information of users acquired from the emotion analysis system 170, and information created from analysis results of emotion information to the broadcast receiving terminal 300 as telop information.

FIG. 7A shows a case in which emotion information of users is added to video information and FIG. 7B shows a case in which information created from analysis results of emotion information is added to video information. The content provider 400 can control the display method, display time and the like of telop information by transmitting a control signal to the broadcast receiving terminal 300. Accordingly, the content provider 400 can provide, for example, information to invite and lure viewers to view a program to users together with video information of a program.

When provision of a program by live broadcasting finishes, the emotion analysis system 170 outputs an acquisition log and analysis results of emotion information to the ECG management system 120 so that the acquisition log and analysis results are reused when the program is rebroadcast (S124).

The ECG management system 120 reconfigures the ECG unit for a rebroadcast program based on the acquisition log and analysis results of emotion information during live broadcasting (S126). The ECG management system 120 can provide information created based on emotion information acquired during live broadcasting of a program and analysis results of the emotion information according to the time code of rebroadcast programs. Also, the ECG management system 120 can add ECG information of a program to which a reaction from users is received, ECG information introducing a sequel of a program and the like to the ECG unit during live broadcasting based on analysis results of emotion information during live broadcasting.

When an ECG unit is reconfigured, just like when an ECG unit is configured, ECG information is reunified, a delivery schedule is recreated, and ECG information is re-extracted, if necessary (S126). By reconfiguring an ECG unit using analysis results of emotion information during live broadcasting, value-added information that is not available during live broadcasting can be provided together with video information of a program.

The ECG delivery system 140 acquires ECG units from the ECG management system 120 according to an ECG delivery schedule to provide/deliver the ECG units to the user terminal 200 and the broadcast receiving terminal 300 (S128).

The ECG management system 120 may allow a user to configure/reconfigure an ECG unit. In such a case, the user configures/reconfigures the ECG unit by associating existing ECG information or ECG information created by the user with a program based on user's preferences. Then, the ECG management system 120 creates a delivery schedule including the ECG unit created by the user to provide ECG units to the user terminal 200 and the broadcast receiving terminal 300 via the ECG delivery system 140. With an ECG unit configured/reconfigured by the user, value-added information that is not available when an ECG is configured/reconfigured under control of the content provider 400 can be provided together with video information of a program.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information providing device connectible to a plurality of broadcast receiving terminals for acquiring and displaying video information of a program and electronic contents guide (ECG) information about the program and a plurality of information acquisition terminals for acquiring and displaying ECG information about the program via a communication network to provide ECG information about the program to the broadcast receiving terminals and the information acquisition terminals, comprising:
    an ECG information storage unit for storing the ECG information including attribute information;
    an emotion information acquisition unit for acquiring emotion information representing emotions of viewers about content of the program displayed by the broadcast receiving terminals via at least one of the information acquisition terminals in real-time in linkage with progression of the program;
    an emotion information analysis unit for analyzing at least one piece of the acquired emotion information;
    an ECG unit configuration unit for configuring an ECG unit by associating at least one piece of the ECG information with the program and associating at least one piece of the acquired emotion information with the program based on the attribute information of the ECG information to suit analysis results of the emotion information; and
    an ECG unit providing unit for providing the ECG unit to the plurality of broadcast receiving terminals and the plurality of information acquisition terminals in linkage with a progression of the program,
    wherein the information providing device provides the video information of a program along with the analysis of the emotion information of viewers about content of the video information of the program, which is shared among the plurality of broadcast receiving terminals,
    where emotion information is classified into one of evaluation categories contained in an emotion evaluation pattern defined for each of the programs, the ECG information is classified into one of evaluation categories contained in the emotion evaluation pattern based on the attribute information of the ECG information, and the ECG unit configuration unit configures the ECG unit by associating at least one piece of the ECG information with a program and an evaluation category of the ECG information based on the attribute information of the ECG information to suit analysis results of the emotion information, and
    wherein the ECG unit configuration unit configures the ECG unit to add supplementary information when an amount of emotion information classified into a specific evaluation category exceeds a predetermined threshold.

2. The information providing device according to claim 1, wherein the ECG unit configuration unit configures the ECG unit so that when more emotion information classified into a specific evaluation category is acquired than emotion information classified into other evaluation categories based on analysis results of the emotion information, ECG information classified into evaluation categories that can promote or those that can allay emotions represented by the emotion information classified into the specific evaluation category is contained.

3. The information providing device according to claim 1, wherein the ECG unit configuration unit configures the ECG unit so that when an amount of emotion information classified into a specific evaluation category exceeding a predetermined threshold is acquired based on analysis results of the emotion information, ECG information classified into evaluation categories that can promote or those that can allay emotions represented by emotion information classified into the specific evaluation category is contained.

4. The information providing device according to claim 1, wherein the emotion information analysis unit selects emotion information associated with the program based on emotion filter information defined by a content provider providing the program.

5. The information providing device according to claim 1, wherein the ECG unit configuration unit selects ECG information to be associated with the program based on ECG filter information defined by a content provider providing the program.

6. The information providing device according to claim 1, wherein the emotion information analysis unit provides analysis results of the emotion information to a content provider providing the program.

7. The information providing device according to claim 1, wherein the emotion information acquisition unit acquires an evaluation category selected via the information acquisition terminal among evaluation categories contained in an emotion evaluation pattern defined for each of the programs as the emotion information.

8. The information providing device according to claim 1, wherein the emotion information acquisition unit acquires emotion information qualitatively and/or quantitatively representing emotions of viewers with respect to the program via the information acquisition terminal.

9. The information providing device according to claim 1, wherein an ECG unit about the program is configured by containing the ECG information and associating information associating the ECG information with the program so that the ECG information is associated cross-referably among the ECG units based on identification information of the ECG information and the associating information.

10. An information acquisition terminal contained in an information providing system in which a plurality of broadcast receiving terminals for acquiring and displaying video information of a program and electronic contents guide (ECG) information about the program and a plurality of information acquisition terminals are connectible to an information providing device providing ECG information about the program via a communication network to acquire ECG information about the program from the information providing device before displaying the ECG information, comprising:
    an emotion information providing unit for acquiring emotion information representing emotions of viewers with respect to content of the program displayed by the broadcast receiving terminal to provide the emotion information to the information providing device in real-time in linkage with progression of the program;
    an ECG unit acquisition unit for acquiring an ECG unit configured by associating at least one piece of the ECG information with the program and associating at least one piece of the emotion information with the program based on attribute information of the ECG information to suit analysis results obtained by analyzing at least one piece of the emotion information acquired by the information providing device from the information providing device; and
    a display control unit for controlling a display of the acquired ECG unit, wherein the display control unit controls display of the acquired ECG unit along with an image reduced from video information of the program, wherein the emotion information is classified into one of evaluation categories contained in an emotion evaluation pattern defined for the program, the ECG information is classified into one of evaluation categories contained in the emotion evaluation pattern based on the attribute information of the ECG information, and the ECG unit configuration unit configures the ECG unit by associating at least one piece of the ECG information with a program and an evaluation category of the ECG information based on the attribute information of the ECG information to suit analysis results of the emotion information, and wherein the ECG unit configuration unit configures the ECG unit to add supplementary information when an amount of emotion information classified into a specific evaluation category exceeds a predetermined threshold.

11. The information acquisition terminal according to claim 10, wherein the emotion information acquisition unit acquires emotion information qualitatively and/or quantitatively representing emotions of viewers with respect to the program.

12. A broadcast receiving terminal contained in an information providing system in which a plurality of information acquisition terminals for acquiring electronic contents guide (ECG) information about a program from an information providing device to display the ECG information and a plurality of broadcast receiving terminals are connectible to the information providing device providing the ECG information about the program via a communication network to acquire and display video information of the program and ECG information about the program, comprising:

an ECG unit acquisition unit for acquiring an ECG unit configured by associating at least one piece of the ECG information with the program and associating at least one piece of emotion information representing emotions of viewers with respect to content of the program displayed by the broadcast receiving terminal with the program based on attribute information of the ECG information to suit analysis results obtained by analyzing at least one piece of the emotion information in real-time in linkage with progression of the program acquired by the information providing device from the information providing device; and a display control unit for controlling video information of the acquired program and a display of the acquired ECG unit, wherein the display control unit controls display of the acquired ECG unit along with an image reduced from video information of the acquired program, wherein the emotion information is classified into one of evaluation categories contained in an emotion evaluation pattern defined for the program, the ECG information is classified into one of evaluation categories contained in the emotion evaluation pattern based on the attribute information of the ECG information, and the ECG unit configuration unit configure the ECG unit by associating at least one piece of the ECG information and an evaluation category of the ECG information based on the attribute information of the ECG information to suit analysis results of the emotion information, and where the ECG unit configuration unit configures the ECG unit to add supplementary information when an amount of emotion information classified into a specific evaluation category exceeds a predetermined threshold.

13. The broadcast receiving terminal according to claim 12, further comprising a program effect information processing unit for receiving program effect information provided based on analysis results of the emotion information from a content provider to display the program effect information along with video information of the program.

14. An information providing system in which a plurality of information acquisition terminals for acquiring and displaying electronic contents guide (ECG) information about a program and a plurality of broadcast receiving terminals for acquiring and displaying video information of the program and ECG information about the program are connectible to an information providing device providing ECG information about the program via a communication network, wherein the information providing device, comprising:

an ECG information storage unit for storing the ECG information including attribute information;

an emotion information acquisition unit for acquiring emotion information representing emotions of viewers about content of the program displayed by the broadcast receiving terminals via at least one of the information acquisition terminals in real-time in linkage with progression of the program;

an emotion information analysis unit for analyzing at least one piece of the acquired emotion information;

an ECG unit configuration unit for configuring an ECG unit by associating at least one piece of the ECG information with the program and associating at least one piece of the acquired emotion information with the program based on the attribute information of the ECG information to suit analysis results of the emotion information; and an ECG unit providing unit for providing the ECG unit to the plurality of broadcast receiving terminals and the plurality of information acquisition terminals in linkage with a progression of the program, wherein the information providing system provides the video information of a program along with the analysis of the emotion information of viewers about content of the video information of the program, which is shared among the plurality of broadcast receiving terminals, and wherein the information acquisition terminal includes:

an emotion information providing unit for acquiring the emotion information to provide the emotion information to the information providing device;

an ECG unit acquisition unit for acquiring the ECG unit from the information providing device; and a display control unit for controlling a display of the acquired ECG unit, and the broadcast receiving terminal, having:

an ECG unit acquisition unit for acquiring the ECG unit from the information providing device; and a display control unit for controlling video information of the acquired program and the display of the acquired ECG unit, wherein the display control unit controls display of the acquired ECG unit along with an image reduced from video information of the acquired program, wherein the emotion information is classified into one of evaluation categories contained in an emotion evaluation pattern defined for the program, the ECG information is classified into one of evaluation categories contained in the emotion evaluation pattern based on the attribute information of the ECG information, and the ECG unit configuration unit configures the ECG unit associating at least one piece of the ECG information with a program and an evaluation category of the ECG information based on the attribute information of the ECG information to suit analysis results of the emotion information, and wherein the ECG unit configuration unit configures the ECG unit to add supplementary information when an amount of emotion information classified into a specific evaluation category exceeds a predetermined threshold.

15. An information providing method applied to an information providing system in which a plurality of information acquisition terminals for acquiring and displaying electronic contents guide (ECG) information about a program and a plurality of broadcast receiving terminals for acquiring and displaying video information of the program and ECG information about the program are connectible to an information providing device providing ECG information about the program via a communication network, comprising the steps of:

storing the ECG information including attribute information;

acquiring emotion information representing emotions of viewers about content of the program displayed by the broadcast receiving terminals via at least one of the information acquisition terminals in real-time in linkage with progression of the program;

analyzing at least one piece of the acquired emotion information;

configuring an ECG unit by associating at least one piece of the ECG information with the program and associating at least one piece of the acquired emotion information with the program based on the attribute information of the ECG information to suit analysis results of the emotion information; and providing the ECG unit to the plurality of broadcast receiving terminals and the plurality of information acquisition terminals in linkage with a progression of the program through the information providing device, wherein the information providing system provides the video information of a program along with the analysis of the emotion information of viewers about content of the video information of the program, which is shared among the plurality of broadcast receiving terminals, wherein the emotion information is classified into one of evaluation categories contained in an emotion evaluation pattern defined for the program, the ECG information is classified into one of evaluation categories contained in the evaluation pattern has the attribute information of the ECG information, and the ECG unit configuration unit configures the ECG unit by associating at least one piece of the ECG information with a program and an evaluation category of the ECG information based on the attribute information of the ECG information to suit analysis results of the emotion information, and wherein the ECG unit configuration unit configures the ECG unit to add supplementary information when an amount of emotion information classified into a specific evaluation category exceeds a predetermined threshold.

16. A non-transitory computer-readable medium having stored thereon a program for causing a computer to execute an information providing method applied to an information providing system in which a plurality of information acquisition terminals for acquiring and displaying electronic contents guide (ECG) information about a program and a plurality of broadcast receiving terminals for acquiring and displaying video information of the program and ECG information about the program are connectible to an information providing device providing ECG information about the program via a communication network, wherein the information providing method, comprising the steps of:

storing the ECG information including attribute information;

acquiring emotion information representing emotions of viewers about content of the program displayed by the broadcast receiving terminals via at least one of the information acquisition terminals in real-time in linkage with progression of the program;

analyzing at least one piece of the acquired emotion information;

configuring an ECG unit by associating at least one piece of the ECG information with the program and associating at least one piece of the acquired emotion information with the program based on the attribute information of the ECG information to suit analysis results of the emotion information; and providing the ECG unit to the plurality of broadcast receiving terminals and the plurality of information acquisition terminals in linkage with a progression of the program through the information providing device, wherein the information providing system provides the video information of a program along with the analysis of the emotion information of viewers about content of the video information of the program, which is shared among the plurality of broadcast receiving terminals, wherein the emotion information is classified into one of evaluation categories contained in an emotion evaluation pattern defined for the program, the ECG information is classified into one of evaluation categories contained in the emotion evaluation pattern based on the attribute information of the ECG information, and the ECG unit configuration unit configures the ECG unit by associating at least on piece of the ECG information with a program and an evaluation category of the ECG information based on the attribute information of the ECG information to suit analysis results of the emotion information, and wherein the ECG unit configuration unit configures the ECG to add supplementary information when an amount of emotion information classified into a specific evaluation category exceeds a predetermined threshold.

* * * * *